United States Patent [19]

Mihara

[11] Patent Number: 4,527,868
[45] Date of Patent: Jul. 9, 1985

[54] LARGE-APERTURE RATIO TELEPHOTO LENS SYSTEM

[75] Inventor: Shinichi Mihara, Hachiooji, Japan

[73] Assignee: Olympus Optical Co., Ltd., Tokyo, Japan

[21] Appl. No.: 623,548

[22] Filed: Jun. 25, 1984

Related U.S. Application Data

[63] Continuation of Ser. No. 405,907, Aug. 6, 1982, abandoned.

[30] Foreign Application Priority Data

Aug. 18, 1981 [JP] Japan .............................. 56-128137

[51] Int. Cl.³ .............................................. G02B 13/02
[52] U.S. Cl. ...................................... 350/454; 350/457
[58] Field of Search .............................. 350/454–457

[56] References Cited

U.S. PATENT DOCUMENTS 3,854,797 12/1974 Yokota .
4,045,128 8/1977 Momiyama .
4,176,913 12/1979 Nakamura et al. .
4,348,084 9/1983 Kitagishi et al. .................... 350/454

FOREIGN PATENT DOCUMENTS

53-134425 11/1978 Japan .

Primary Examiner—John K. Corbin
Assistant Examiner—Paul Dzierzynski
Attorney, Agent, or Firm—Cushman, Darby & Cushman

[57] ABSTRACT

A high performance large aperture ratio telephoto lens system having a focal length of 200 mm to 300 mm, aperture ratio of 1:2.0 and low telephoto ratio and comprising a first converging lens group, a diverging lens group and a second converging lens group; said first converging lens group consisting of three positive, positive and negative lens components, said diverging lens group consisting of three lens components, i.e., a positive meniscus lens component, a negative meniscus lens component and a negative cemented doublet, and said second converging lens group comprising at least a cemented doublet consisting of a negative element and a positive element.

7 Claims, 6 Drawing Figures

LARGE-APERTURE RATIO TELEPHOTO LENS SYSTEM

This is a continuation of application Ser. No. 405,907 filed Aug. 6, 1982, now abandoned.

BACKGROUND OF THE INVENTION (a) Field of the Invention

The present invention relates to a high performance large aperture ratio telephoto lens system having a focal length of 200 mm to 300 mm.

(b) Description of the Prior Art

The conventional telephoto lens systems having focal lengths of 200 mm to 300 mm were generally designed for aperture ratios on the order of F4 or F2.8 at best. In the recent trend, however, interchangeable lenses for cameras of 35 mm size film are designed for larger aperture ratios and development of telephoto lens systems having larger aperture ratio are desired. In designing a telephoto lens system having a larger aperture ratio, the greatest problems lie in the difficulty to correct chromatic aberration due to secondary spectrum, difficulty to correct spherical aberration and Petzval's sum at the same time, and to prevent total length of the lens system from being prolonged remarkably. For this reason, the telephoto lens system having an aperture ratio on the order of F2.0 is only the one disclosed by Unexamined Published Japanese Patent Application No. 134425/78. This lens system and other conventional examples have large telephoto ratios around 1.2 and large Petzval's sums $$\Sigma P \left( = \sum_i \left( \frac{1}{n_i f_i} \right) \times f \right)$$

around 0.2.

SUMMARY OF THE INVENTION

A general object of the present invention is to provide a telephoto lens system which has large aperture ratio of 1:2.0 and high performance in combination with a focal length of 200 mm to 300 mm.

The lens system according to the present invention basically consists of a first converging lens group arranged on the object side, a diverging lens group arranged on the image side of said first converging lens group with a relatively wide airspace reserved therefrom and a second converging lens group arranged on the image side of said diverging lens group with a relatively wide airspace reserved therefrom. Said first converging lens group comprises three positive, positive and negative lens components arranged in due order from the object side, said diverging lens group comprises three lens components, i.e., a positive meniscus lens component having a convex surface on the object side, a negative meniscus lens component having a convex surface on the object side and a negative cemented doublet consisting of a positive element and a negative element, and said second converging lens group comprises at least one cemented doublet consisting of a negative element and a positive element. The lens system according to the present invention has made it possible to favorably correct spherical aberration while sufficiently minimizing Petzval's sum especially by arranging a positive meniscus lens component having a convex surface on the object side and made of a glass material having a relatively high refractive index on the object side in said diverging lens group and the negative meniscus lens component having a convex surface on the object side and made of a glass material having a relatively low refractive index immediately on the image side of said positive meniscus lens component.

The positive meniscus lens component in said diverging lens group may be arranged far on the object side in said diverging lens group to minimize the airspace between said diverging lens group and said first converging lens group. In such a case, however, the lens system as a whole will be long and heavy. In view of the fact that the lens system uses a glass material which has high refractive index in combination with low dispersion power and is highly priced, arranging said positive meniscus lens component far on the object side is not preferable.

It is possible to obtain a high performance large-aperture ratio telephoto lens system having a focal length of 200 mm to 300 mm by selecting the lens composition described above.

In order to obtain a high performance lens system whose telephoto ratio is minimized to 1.0~1.1 and aberrations are favorably corrected, it is more preferable to design the lens system having the above-described composition so as to satisfy the following conditions:

$$1.0f < f_I < 1.7f \tag{1}$$

$$0.5f < |f_{II}| > 2.0f \tag{2}$$

$$0.4f < f_{III} < 0.9f \tag{3}$$

$$n_4 > 1.65 \tag{4}$$

$$n_5 < 1.55 \tag{5}$$

wherein the reference symbols are defined as follows:
f: focal length of the lens system as a whole
$f_I$: focal length of the first converging lens group
$f_{II}$: focal length of the diverging lens group
$f_{III}$: focal length of the second converging lens group
$n_4$: refractive index of the positive meniscus lens component arranged in the diverging lens group
$n_5$: refractive index of the negative meniscus lens component arranged in the diverging lens group In order to accomplish one of the objects of the present invention, i.e., to design a lens system having a low telephoto ratio, it is necessary to locate the rear principal point at rather a front position in the lens system. For this purpose, it is necessary to impart a strong converging power to the first converging lens group and a strong diverging power to the diverging lens group which is arranged with a narrow space reserved from said first converging lens group.

The conditions (1) and (2) define focal lengths of the first converging lens group and diverging lens group respectively. If the lower limits of these conditions are exceeded, it will be difficult to accomplish one of the objects of the present invention, i.e., to design a lens system having a telephoto ratio below 1.1. If the upper limits of these conditions are exceeded, in contrast, it will be difficult to correct spherical aberration, astigmatism and other aberrations at the same time.

The condition (3) defines focal length of the second converging lens group. If the upper limit of this condition is exceeded, especially pin cushion distortion will easily be produced. If the lower limit of the condition (3) is exceeded, in contrast, the rear principal point of the lens system will shift rearward, making it impossible to design a lens system having a telephoto ratio below 1.1. When the positive meniscus lens component and negative meniscus lens component in the diverging lens group have refractive indices $n_4 > 1.65$ and $n_5 < 1.55$ respectively so as to satisfy the conditions (4) and (5), Petzval's sum can be sufficiently minimized and spherical aberration can be corrected favorably in the lens system.

If these conditions are not satisfied, Petzval's sum will be enlarged and spherical aberration will be aggravated.

Now, focusing of the lens system having the above-described composition according to the present invention with an inner focusing system will be described. In a case where a lens system is focused with an inner focusing system, aberrations are remarkably variable during focusing operation, thereby making it impossible to obtain stable imaging performance for objects located at infinite distance to short distance. The conventional lens systems adopting the inner focusing systems comprise two or fewer independently movable lens groups or components, and could minimize variations of spherical aberration and chromatic aberration at most during focusing operation by shapes and combination of individual lens group or components in the lens systems. The conventional lens systems were incapable of minimizing variation of astigmatism.

The lens system according to the present invention comprises at least three movable lens components (including lens group) and adopts a system for focusing by shifting the lens components while changing relative positions of the individual lens components. The lens system according to the present invention is focused on an object located at a short distance by shifting the negative cemented doublet arranged on the image side in the diverging lens group toward the image side. In this case, however, spherical aberration and astigmatism are overcorrected. Therefore, the negative meniscus lens component arranged on the object side in the diverging lens group is shifted toward the image side and the second converging lens group is shifted as a whole to correct spherical aberration and astigmatism sufficiently favorably with no overcorrection or undercorrection. Further, spherical aberration due to paraxial zonal rays is apt to be undercorrected even when spherical aberration due to paraxial marginal rays is corrected favorably. This tendency is remarkable when radius of curvature is large or negative on the object side surface of the negative meniscus lens component which is shifted in the diverging lens group for focusing on an object located at a short distance. It is therefore desirable to select said radius of curvature within a range of 0.2f to 0.3f.

By adopting the above-described focusing system, it is possible to favorably correct both spherical aberration and astigmatism to a photographing magnification of 1/10. In order to prevent variation of chromatic aberration in this case, it is preferable to select difference of Abbe's number $\nu_{6n} - \nu_{6p}$ between Abbe's number $\nu_{6p}$ of the positive element and Abbe's number $\nu_{6n}$ of the negative element of the negative cemented doublet arranged on the image side in the diverging lens group within the range defined below:

$$\nu_{6n} - \nu_{6p} > 15 \qquad (6)$$

In order to favorably correct longitudinal chromatic aberration and lateral chromatic aberration at the same time in this case, it is preferable to compose the second converging lens group of two lens components, i.e., a positive lens component and a cemented doublet consisting of a positive element and a negative element, and select difference of Abbe's number $\nu_{8p} - \nu_{8n}$ between Abbe's number $\nu_{8p}$ of the positive element and Abbe's number $\nu_{8n}$ of negative element within the range defined by the following condition (7):

$$\nu_{8p} - \nu_{8n} > 15$$

Further, it is more preferable to define upper limits of the conditions (6) and (7) at 35: $35 > \nu_{6n} - \nu_{6p} > 15$ and $35 > \nu_{8p} - \nu_{8n} > 15$ since the upper limits are effective to minimize variation of chromatic aberration.

DETAILED DESCRIPTION OF THE PREFERRED EMBODIMENTS

Now numerical data of the preferred embodiments of the present invention will be described below:

| | | | |
|---|---|---|---|
| $r_1 = 68.0208$ | | | |
| | $d_1 = 8.0005$ | $n_1 = 1.49700$ | $\nu_1 = 81.61$ |
| $r_2 = -266.8289$ | | | |
| | $d_2 = 0.2021$ | | |
| $r_3 = 42.3597$ | | | |
| | $d_3 = 6.4007$ | $n_2 = 1.49700$ | $\nu_2 = 81.61$ |
| $r_4 = 145.2983$ | | | |
| | $d_4 = 2.2019$ | | |
| $r_5 = 281.4384$ | | | |
| | $d_5 = 3.2018$ | $n_3 = 1.63636$ | $\nu_3 = 35.37$ |
| $r_6 = 46.8152$ | | | |
| | $d_6 = 14.0014$ | | |
| $r_7 = 26.0506$ | | | |
| | $d_7 = 4.8014$ | $n_4 = 1.72000$ | $\nu_4 = 50.25$ |
| $r_8 = 42.5384$ | | | |
| | $d_8 = 2.8022$ | | |
| $r_9 = 21.7106$ | | | |
| | $d_9 = 2.0000$ | $n_5 = 1.51454$ | $\nu_5 = 54.69$ |
| $r_{10} = 14.8613$ | | | |
| | $d_{10} = 6.4000$ | | |
| $r_{11} = -76.2281$ | | | |
| | $d_{11} = 1.6014$ | $n_6 = 1.61340$ | $\nu_6 = 43.84$ |
| $r_{12} = 23.0764$ | | | |
| | $d_{12} = 3.2000$ | $n_7 = 1.61800$ | $\nu_7 = 63.38$ |
| $r_{13} = 41.1764$ | | | |
| | $d_{13} = 12.4018$ | | |
| $r_{14} = 69.7200$ | | | |
| | $d_{14} = 1.6006$ | $n_8 = 1.70154$ | $\nu_8 = 41.21$ |
| $r_{15} = 40.7171$ | | | |
| | $d_{15} = 3.2000$ | $n_9 = 1.69700$ | $\nu_9 = 48.51$ |
| $r_{16} = -70.5357$ | | | |
| $f = 100$, $2\omega = 10.2°$, telephoto ratio = 1.08 | | | |
| $\Sigma p = 0.128$, $f_I = 118.6$, $f_{II} = -66.4$, $f_{III} = 51.1$ | | | |

| Embodiment 2 | | | |
|---|---|---|---|
| $r_1 = 67.5238$ | | | |
| | $d_1 = 8.0005$ | $n_1 = 1.49700$ | $\nu_1 = 81.61$ |
| $r_2 = -341.5027$ | | | |
| | $d_2 = 0.2021$ | | |
| $r_3 = 42.0768$ | | | |
| | $d_3 = 6.4008$ | $n_2 = 1.49700$ | $\nu_2 = 81.61$ |
| $r_4 = 188.8117$ | | | |
| | $d_4 = 2.2019$ | | |
| $r_5 = 283.5226$ | | | |
| | $d_5 = 3.2018$ | $n_3 = 1.64769$ | $\nu_3 = 33.80$ |
| $r_6 = 48.4993$ | | | |
| | $d_6 = 14.0014$ | | |
| $r_7 = 30.0540$ | | | |
| | $d_7 = 4.8014$ | $n_4 = 1.72000$ | $\nu_4 = 50.25$ |
| $r_8 = 42.1419$ | | | |
| | $d_8 = 2.8022$ | | |
| $r_9 = 21.1592$ | | | |
| | $d_9 = 2.0000$ | $n_5 = 1.54072$ | $\nu_5 = 47.20$ |
| $r_{10} = 16.0385$ | | | |
| | $d_{10} = 6.3999$ | | |
| $r_{11} = -69.5224$ | | | |
| | $d_{11} = 1.6014$ | $n_6 = 1.51454$ | $\nu_6 = 54.69$ |
| $r_{12} = 23.8321$ | | | |
| | $d_{12} = 3.2000$ | $n_7 = 1.71300$ | $\nu_7 = 53.84$ |
| $r_{13} = 33.1194$ | | | |
| | $d_{13} = 12.4018$ | | |
| $r_{14} = 72.6487$ | | | |
| | $d_{14} = 1.6006$ | $n_8 = 1.70154$ | $\nu_8 = 41.21$ |
| $r_{15} = 34.1003$ | | | |
| | $d_{15} = 3.2000$ | $n_9 = 1.69350$ | $\nu_9 = 53.23$ |
| $r_{16} = -72.2298$ | | | |
| $f = 100$, $2\omega = 10.2°$, telephoto ratio = 1.08 | | | |
| $\Sigma p = 0.102$, $f_I = 110.3$, $f_{II} = -63.8$, $f_{III} = 53.3$ | | | |

| Embodiment 3 | | | |
|---|---|---|---|
| $r_1 = 60.1219$ | | | |
| | $d_1 = 7.9999$ | $n_1 = 1.49700$ | $\nu_1 = 81.61$ |
| $r_2 = -158.9389$ | | | |
| | $d_2 = 0.1996$ | | |
| $r_3 = 45.6746$ | | | |
| | $d_3 = 6.3984$ | $n_2 = 1.49700$ | $\nu_2 = 81.61$ |
| $r_4 = 170.9999$ | | | |
| | $d_4 = 2.1976$ | | |
| $r_5 = -246.0070$ | | | |
| | $d_5 = 3.2008$ | $n_3 = 1.63636$ | $\nu_3 = 35.37$ |
| $r_6 = 48.5730$ | | | |
| | $d_6 = 14.0001$ | | |
| $r_7 = 36.0737$ | | | |
| | $d_7 = 4.8006$ | $n_4 = 1.77250$ | $\nu_4 = 49.66$ |
| $r_8 = 79.1667$ | | | |
| | $d_8 = D_1$ | | |
| $r_9 = 25.9565$ | | | |
| | $d_9 = 2.0000$ | $n_5 = 1.54072$ | $\nu_5 = 47.20$ |
| $r_{10} = 18.5907$ | | | |
| | $d_{10} = D_2$ | | |
| $r_{11} = 252.3552$ | | | |
| | $d_{11} = 3.2000$ | $n_6 = 1.62588$ | $\nu_6 = 35.70$ |
| $r_{12} = -45.6600$ | | | |
| | $d_{12} = 1.6000$ | $n_7 = 1.58913$ | $\nu_7 = 60.97$ |
| $r_{13} = 33.7926$ | | | |
| | $d_{13} = D_3$ | | |
| $r_{14} = 93.2740$ | | | |
| | $d_{14} = 3.1983$ | $n_8 = 1.73400$ | $\nu_8 = 51.49$ |
| $r_{15} = -43.1743$ | | | |
| | $d_{15} = 1.2006$ | | |
| $r_{16} = -45.7817$ | | | |
| | $d_{16} = 1.2000$ | $n_9 = 1.58144$ | $\nu_9 = 40.75$ |
| $r_{17} = 27.9911$ | | | |
| | $d_{17} = 2.8000$ | $n_{10} = 1.58913$ | $10 = 60.97$ |
| $r_{18} = 1418.8106$ | | | |
| $f = 100$, $2\omega = 10.2°$, telephoto ratio = 1.08 | | | |
| $\Sigma p = 0.146$, $f_I = 148.9$, $f_{II} = -184.5$, $f_{III} = 80.9$ | | | |

| object point | $D_1$ | $D_2$ | $D_3$ | $f$ |
|---|---|---|---|---|
| $\infty$ | 2.8003 | 6.4000 | 13.1999 | 100.0 |
| 0.96 m | 4.1700 | 14.4000 | 8.5750 | 91.3504 | wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $\nu_1, \nu_2, \ldots$ represent Abbe's numbers of the respective lens elements and the reference symbol $\Sigma p$ designates Petzval's sum.

Figure 1:
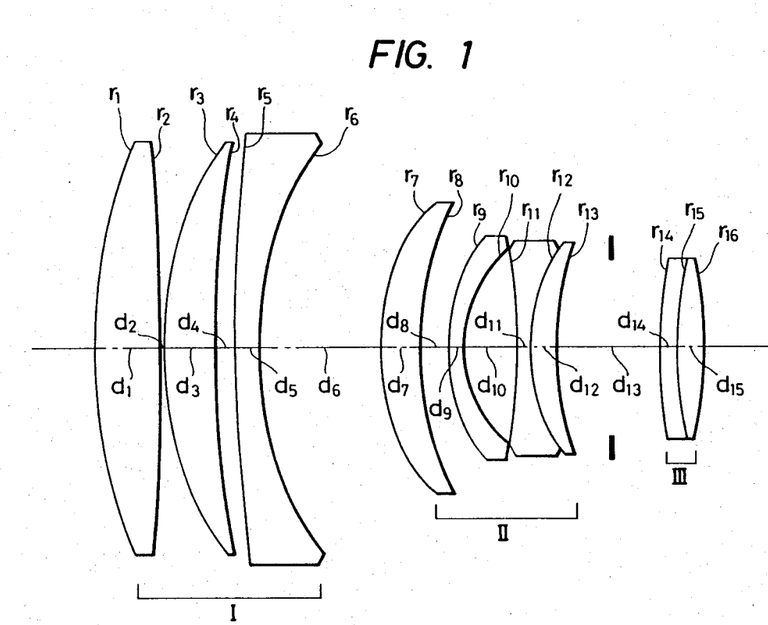
FIG. 1 shows a sectional view illustrating composition of lens systems preferred as Embodiment 1 and 2 of the present invention.
Figure 2:
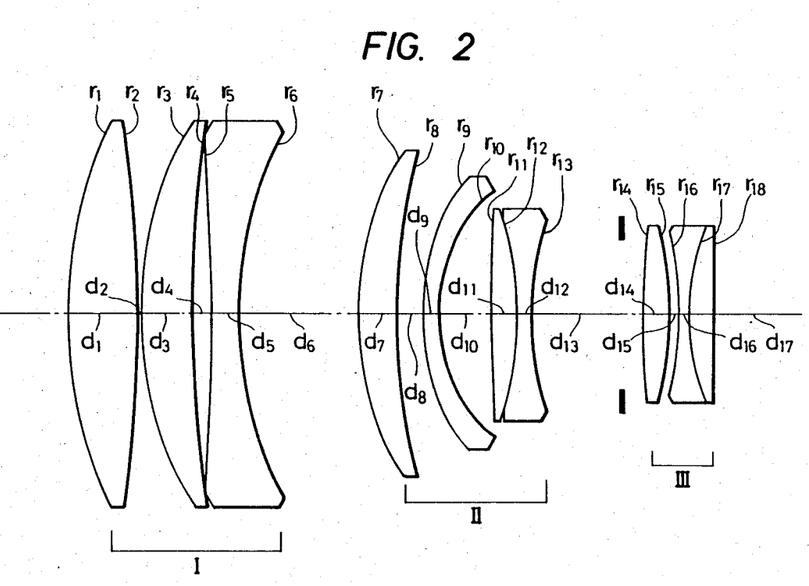
FIG. 2 shows a sectional view illustrating composition of a lens system preferred as Embodiment 3 of the present invention.
Figure 3:
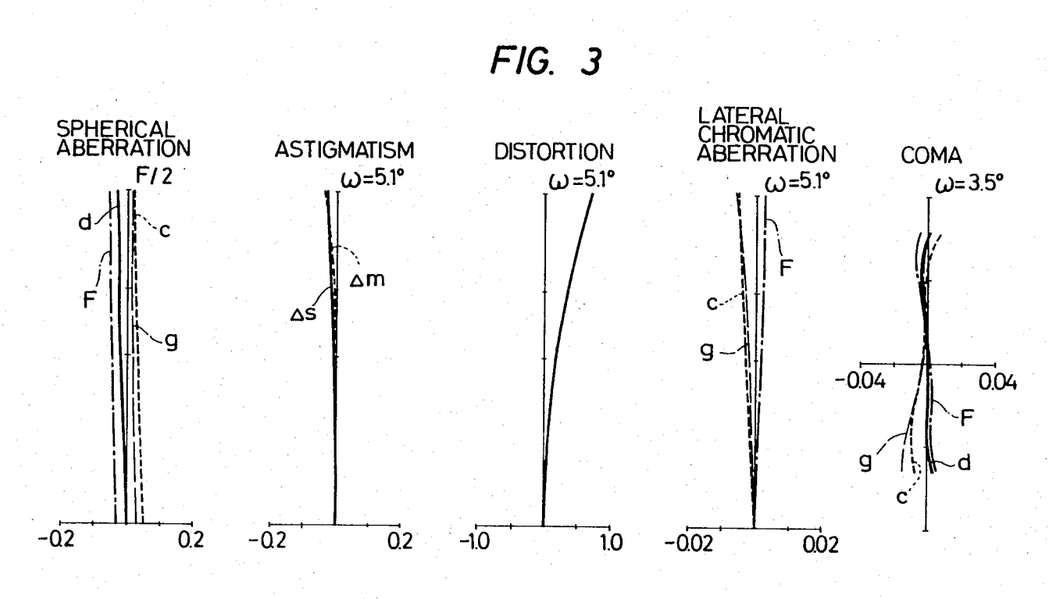
FIG. 3 shows curves illustrating aberration characteristics of the Embodiment 1.
Figure 4:
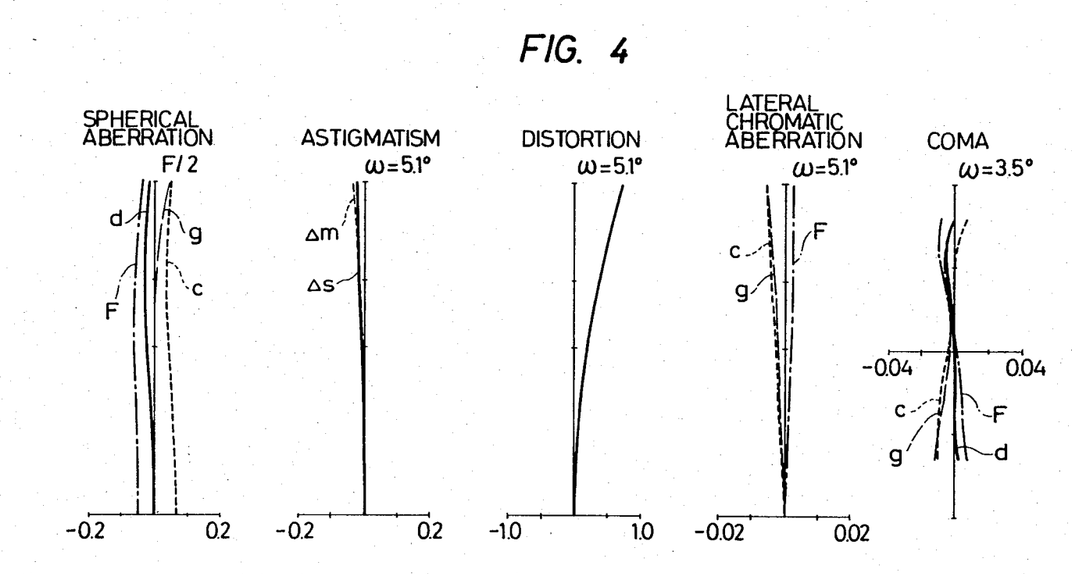
FIG. 4 shows curves illustrating aberration characteristics of the Embodiment 2.
Figure 5:
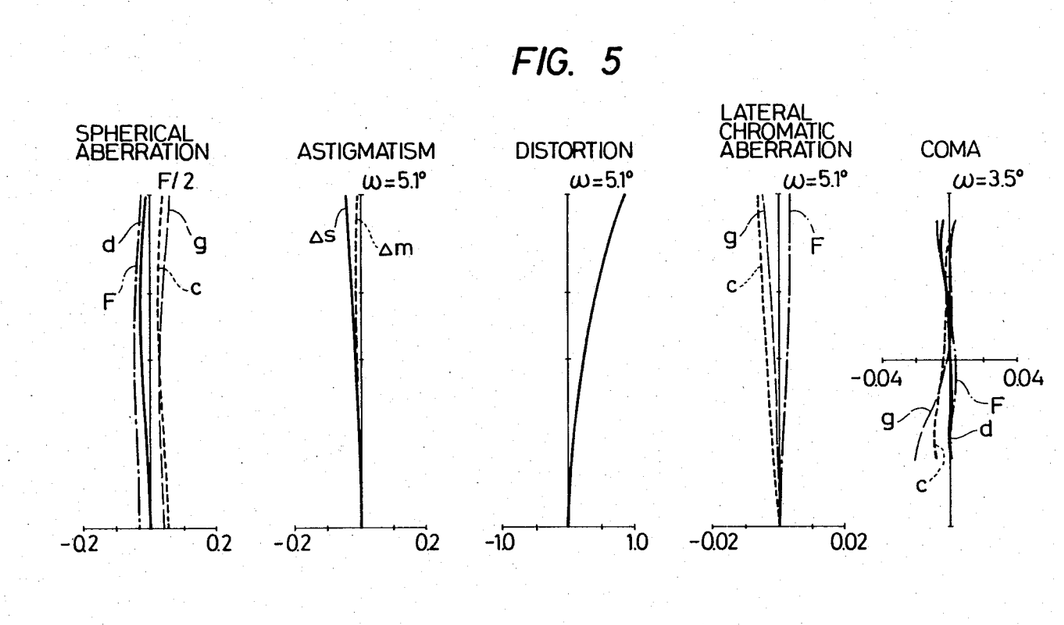
FIG. 5 shows graphs illustrating aberration characteristics of the Embodiment 3.
Figure 6:
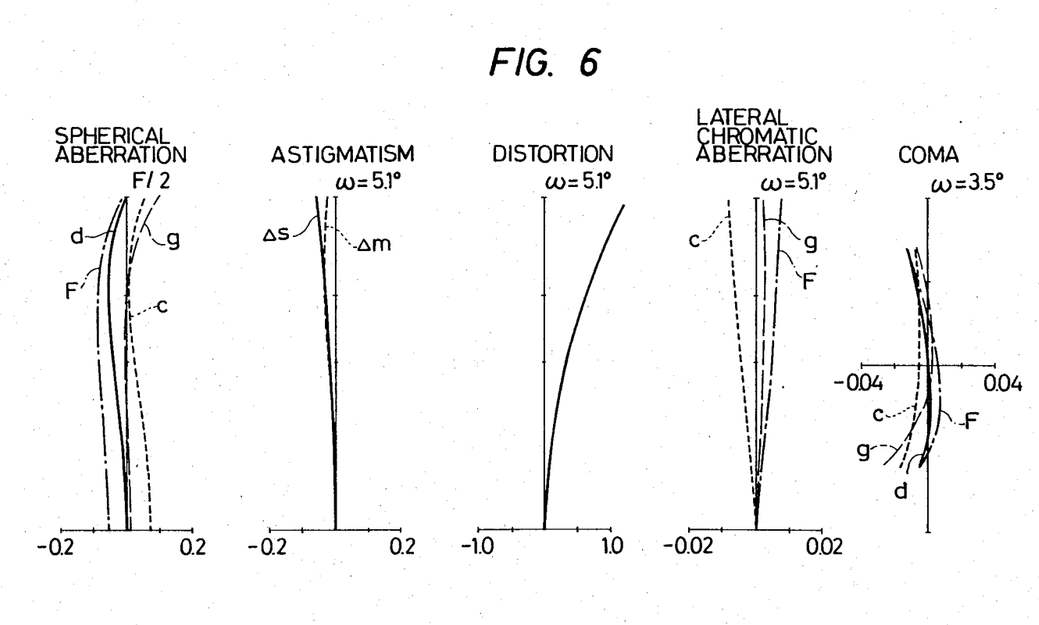
FIG. 6 shows graphs illustrating aberration characteristics of the Embodiment 3 when it is focused on an object located at a short distance.

Out of the embodiments described above, the Embodiments 1 and 2 have the lens composition illustrated in FIG. 1 and aberration characteristics visualized in FIG. 3 and FIG. 4 respectively. The Embodiment 3 has the lens composition illustrated in FIG. 2. The Embodiment 3 is designed for focusing and correcting aberrations when focused on an object located at a short distance by adjusting airspace $d_8 = D_1$, $d_{10} = D_2$ and $d_{13} = D_3$. Aberration characteristics of the Embodiment 3 are visualized in FIG. 5 (when focused on an object located at infinite distance). Aberration characteristics of the Embodiment 3 when focused on an object located at a distance of 0.96 m (magnification 1/10) are illustrated in FIG. 6.

I claim:

1. A large-aperture ratio telephoto lens system having aperture ratio of F/2 and comprising a first converging lens group, a diverging lens group arranged with a relatively wide airspace reserved from said converging lens group, and a second converging lens group arranged with a relatively wide airspace reserved from said diverging lens group; said first converging lens group comprising a positive lens component, a positive lens component and a negative meniscus lens component having a convex surface on the object side, said diverging lens group consisting of a positive meniscus lens component having a convex surface on the object side, a negative meniscus lens component having a convex surface on the object side and a cemented doublet consisting of a positive element and a negative element, and said second converging lens group comprising at least a cemented doublet consisting of a negative element and a positive element, said large-aperture ratio telephoto lens system satisfying the following conditions (1) through (5):

$$1.0f < f_I < 1.7f \quad (1)$$

$$0.6f < |f_{II}| < 2.0f \quad (2)$$

$$0.4f < f_{III} < 0.9f \quad (3)$$

$$n_4 > 1.65 \quad (4)$$

$$n_5 < 1.55 \quad (5)$$

wherein the reference symbol f represents total focal length of the lens system as a whole, the reference symbol $f_I$ designates focal length of said first converging lens group, the reference symbol $f_{II}$ denotes focal length of said diverging lens group, the reference symbol $f_{III}$ represents focal length of said second converging lens group, the reference symbol $n_4$ designates refractive index of the positive meniscus lens component arranged in said diverging lens group and the reference symbol $n_5$ denotes refractive index of the negative meniscus lens component arranged in said diverging lens group.

2. A large-aperture ratio telephoto lens system according to claim 1 wherein said second converging lens group comprises a positive cemented doublet consisting of a negative element and a positive element.

3. A large-aperture ratio telephoto lens system according to claim 2 having the following numerical data:

| | | | |
|---|---|---|---|
| $r_1 = 68.0208$ | | | |
| | $d_1 = 8.0005$ | $n_1 = 1.49700$ | $\nu_1 = 81.61$ |
| $r_2 = -266.8289$ | | | |
| | $d_2 = 0.2021$ | | |
| $r_3 = 42.3597$ | | | |
| | $d_3 = 6.4007$ | $n_2 = 1.49700$ | $\nu_2 = 81.61$ |
| $r_4 = 145.2983$ | | | |
| | $d_4 = 2.2019$ | | |
| $r_5 = 281.4384$ | | | |
| | $d_5 = 3.2018$ | $n_3 = 1.63636$ | $\nu_3 = 35.37$ |
| $r_6 = 46.8152$ | | | |
| | $d_6 = 14.0014$ | | |
| $r_7 = 26.0506$ | | | |
| | $d_7 = 4.8014$ | $n_4 = 1.72000$ | $\nu_4 = 50.25$ |
| $r_8 = 42.5384$ | | | |
| | $d_8 = 2.8022$ | | |
| $r_9 = 21.7106$ | | | |
| | $d_9 = 2.0000$ | $n_5 = 1.51454$ | $\nu_5 = 54.69$ |
| $r_{10} = 14.8613$ | | | |
| | $d_{10} = 6.4000$ | | |
| $r_{11} = -76.2281$ | | | |
| | $d_{11} = 1.6014$ | $n_6 = 1.61340$ | $\nu_6 = 43.84$ |
| $r_{12} = 23.0764$ | | | |
| | $d_{12} = 3.2000$ | $n_7 = 1.61800$ | $\nu_7 = 63.38$ |
| $r_{13} = 41.1764$ | | | |
| | $d_{13} = 12.4018$ | | |
| $r_{14} = 69.7200$ | | | |
| | $d_{14} = 1.6006$ | $n_8 = 1.70154$ | $\nu_8 = 41.21$ |
| $r_{15} = 40.7171$ | | | |
| | $d_{15} = 3.2000$ | $n_9 = 1.69700$ | $\nu_9 = 48.51$ |
| $r_{16} = -70.5357$ | | | |
| $f = 100$, $2\omega = 10.2°$, telephoto ratio $= 1.08$ | | | |
| $\Sigma p = 0.128$, $f_I = 118.6$, $f_{II} = -66.4$, $f_{III} = 51.1$ | | | | wherein the reference symbols $r_1$ through $r_{16}$ represent radii of curvature on the surfaces of the respective lens elements, the reference symbols $d_1$ through $d_{15}$ designate thicknesses of the respective lens elements and airspaces reserved therebetween, the reference symbols $n_1$ through $n_9$ denote refractive indices of the respective lens elements, the reference symbols $\nu_1$ through $\nu_9$ represent Abbe's numbers of the respective lens elements, the reference symbol $2\omega$ designates field angle and the reference symbol $\Sigma p$ denotes Petzval's sum.

4. A large-aperture ratio telephoto lens system according to claim 2 having the following numerical data:

| | | | |
|---|---|---|---|
| $r_1 = 67.5238$ | | | |
| | $d_1 = 8.0005$ | $n_1 = 1.49700$ | $\nu_1 = 81.61$ |
| $r_2 = -341.5027$ | | | |
| | $d_2 = 0.2021$ | | |
| $r_3 = 42.0768$ | | | |
| | $d_3 = 6.4008$ | $n_2 = 1.49700$ | $\nu_2 = 81.61$ |
| $r_4 = 188.8117$ | | | |
| | $d_4 = 2.2019$ | | |
| $r_5 = 283.5226$ | | | |
| | $d_5 = 3.2018$ | $n_3 = 1.64769$ | $\nu_3 = 33.80$ |
| $r_6 = 48.4993$ | | | |
| | $d_6 = 14.0014$ | | |
| $r_7 = 30.0540$ | | | |
| | $d_7 = 4.8014$ | $n_4 = 1.72000$ | $\nu_4 = 50.25$ |
| $r_8 = 42.1419$ | | | |
| | $d_8 = 2.8022$ | | |
| $r_9 = 21.1592$ | | | |
| | $d_9 = 2.0000$ | $n_5 = 1.54072$ | $\nu_5 = 47.20$ |
| $r_{10} = 16.0385$ | | | |
| | $d_{10} = 6.3999$ | | |
| $r_{11} = -69.5224$ | | | |
| | $d_{11} = 1.6014$ | $n_6 = 1.51454$ | $\nu_6 = 54.69$ |
| $r_{12} = 23.8321$ | | | |
| $r_{13} = 33.1194$ | $d_{12} = 3.2000$ | $n_7 = 1.71300$ | $\nu_7 = 53.84$ |
| | $d_{13} = 12.4018$ | | |
| $r_{14} = 72.6487$ | | | |
| | $d_{14} = 1.6006$ | $n_8 = 1.70154$ | $\nu_8 = 41.21$ |
| $r_{15} = 34.1003$ | | | |
| | $d_{15} = 3.2000$ | $n_9 = 1.69350$ | $\nu_9 = 53.23$ |
| $r_{16} = -72.2298$ | | | |
| $f = 100$, $2\omega = 10.2°$, telephoto ratio $= 1.08$ | | | |
| $\Sigma p = 0.102$, $f_I = 110.3$ $f_{II} = -63.8$, $f_{III} = 53.3$ | | | | wherein the reference symbols $r_1$ through $r_{16}$ represent radii of curvature on the surfaces of the respective lens elements, the reference symbols $d_1$ through $d_{15}$ designate thicknesses of the respective lens elements and airspaces reserved therebetween, the reference symbols $n_1$ through $n_9$ denote refractive indices of the respective lens elements, the reference symbols $\nu_1$ through $\nu_9$ represent Abbe's numbers of the respective lens elements, the reference symbol $2\omega$ designates field angle and the reference symbol $\Sigma p$ denotes Petzval's sum.

5. A large-aperture ratio telephoto lens system according to claim 1 wherein said second converging lens group comprises a positive single-element lens component and a cemented doublet consisting of a negative element and a positive element, lens system satisfying the following conditions (6) and (7):

$$\nu_{6n} - \nu_{6p} > 15 \tag{6}$$

$$\nu_{8p} - \nu_{8n} > 15 \tag{7}$$

wherein the reference symbols $\nu_{6n}$ and $\nu_{6p}$ represent Abbe's numbers of the negative element and positive element respectively of said diverging lens group, and the reference symbols $\nu_{8p}$ and $\nu_{8n}$ designate Abbe's numbers of the positive lens component and negative lens component respectively of said second converging lens group.

6. A large-aperture ratio telephoto lens system according to claim 5 wherein focusing is performed by shifting the negative cemented doublet toward the image side in said diverging lens group, and aberrations are corrected when said lens system is focused on an object located at a short distance by independently shifting the negative meniscus lens component in said diverging lens group and said second lens group as a whole respectively.

7. A large-aperture ratio telephoto lens system according to claim 6 having the following numerical data:

| | | | |
|---|---|---|---|
| $r_1 = 60.1219$ | | | |
| | $d_1 = 7.9999$ | $n_1 = 1.49700$ | $\nu_1 = 81.61$ |
| $r_2 = -158.9389$ | | | |
| | $d_2 = 0.1996$ | | |
| $r_3 = 45.6746$ | | | |
| | $d_3 = 6.3984$ | $n_2 = 1.49700$ | $\nu_2 = 81.61$ |
| $r_4 = 170.9999$ | | | |
| | $d_4 = 2.1976$ | | |
| $r_5 = -246.0070$ | | | |
| | $d_5 = 3.2008$ | $n_3 = 1.63636$ | $\nu_3 = 35.37$ |
| $r_6 = 48.5730$ | | | |
| | $d_6 = 14.0001$ | | |
| $r_7 = 36.0737$ | | | |
| | $d_7 = 4.8006$ | $n_4 = 1.77250$ | $\nu_4 = 49.66$ |
| $r_8 = 79.1667$ | | | |
| | $d_8 = D_1$ | | |
| $r_9 = 25.9565$ | | | |
| | $d_9 = 2.0000$ | $n_5 = 1.54072$ | $\nu_5 = 47.20$ |
| $r_{10} = 18.5907$ | | | |

-continued

| | $d_{10} = D_2$ | | |
|---|---|---|---|
| $r_{11} = 252.3552$ | | | |
| | $d_{11} = 3.2000$ | $n_6 = 1.62588$ | $\nu_6 = 35.70$ |
| $r_{12} = -45.6600$ | | | |
| | $d_{12} = 1.6000$ | $n_7 = 1.58913$ | $\nu_7 = 60.97$ |
| $r_{13} = 33.7926$ | | | |
| | $d_{13} = D_3$ | | |
| $r_{14} = 93.2740$ | | | |
| | $d_{14} = 3.1983$ | $n_8 = 1.73400$ | $\nu_8 = 51.49$ |
| $r_{15} = -43.1743$ | | | |
| | $d_{15} = 1.2006$ | | |
| $r_{16} = -45.7817$ | | | |
| | $d_{16} = 1.2000$ | $n_9 = 1.58144$ | $\nu_9 = 40.75$ |
| $r_{17} = 27.9911$ | | | |
| | $d_{17} = 2.8000$ | $n_{10} = 1.58913$ | $\nu_{10} = 60.97$ |
| $r_{18} = 1418.8106$ | | | |

$f = 100$, $2\omega = 10.2°$, telephoto ratio = 1.08

-continued $\Sigma p = 0.146$, $f_I = 148.9$, $f_{II} = -184.5$, $f_{III} = 80.9$

| object point | $D_1$ | $D_2$ | $D_3$ | f |
|---|---|---|---|---|
| $\infty$ | 2.8003 | 6.4000 | 13.1999 | 100.0 |
| 0.96 m | 4.1700 | 14.4000 | 8.5750 | 91.3504 | wherein the reference symbols $r_1$ through $r_{18}$ represent radii of curvature on the surfaces of the respective lens elements, the reference symbols $d_1$ through $d_{17}$ designate thicknesses of the respective lens elements and airspaces reserved therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol $2\omega$ designates field angle and the reference symbol $\Sigma p$ denotes Petzval's sum.

* * * * *